United States Patent
Diederich et al.

(10) Patent No.: US 10,705,909 B2
(45) Date of Patent: Jul. 7, 2020

(54) FILE LEVEL DEFINED DE-CLUSTERED REDUNDANT ARRAY OF INDEPENDENT STORAGE DEVICES SOLUTION

(71) Applicant: International Business Machines Corporation, Armonk, NY (US)

(72) Inventors: Michael Diederich, Mainz (DE); Thorsten Muehge, Budenheim (DE); Erik Rueger, Ockenheim (DE); Stefan Schmidt, Gau-Odernheim (DE); Rainer Wolafka, Hofheim-Langenhain (DE)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 14/749,688

(22) Filed: Jun. 25, 2015

(65) Prior Publication Data
US 2016/0378600 A1    Dec. 29, 2016

(51) Int. Cl.
*G06F 3/06* (2006.01)
*G06F 11/10* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC ............... G06F 11/1008; G06F 11/028; G06F 11/1076; G06F 11/1044; G06F 11/2094; G06F 11/1662; G06F 11/1028; G06F 17/30; G06F 3/0689; G06F 3/0619; G06F 3/064; H05K 999/99
USPC .................................................. 714/767, 6.2
See application file for complete search history.

(56) References Cited

U.S. PATENT DOCUMENTS

| | | | | |
|---|---|---|---|---|
| 5,566,316 | A * | 10/1996 | Fechner | G06F 11/1662 711/114 |
| 6,766,491 | B2 * | 7/2004 | Busser | G06F 11/2092 711/114 |
| 7,260,848 | B2 * | 8/2007 | Zimmer | G06F 9/4401 380/200 |
| 7,685,126 | B2 * | 3/2010 | Patel | G06F 11/1076 707/770 |
| 7,822,939 | B1 * | 10/2010 | Veprinsky | G06F 3/0608 711/161 |
| 7,873,700 | B2 * | 1/2011 | Pawlowski | G06F 3/0607 709/213 |
| 8,046,628 | B2 * | 10/2011 | Resnick | G06F 11/073 714/52 |
| 8,140,860 | B2 * | 3/2012 | Haswell | G06F 3/0619 713/165 |
| 8,214,590 | B2 * | 7/2012 | Ulrich | G06F 3/061 711/114 |
| 8,291,208 | B2 | 10/2012 | Thompson | |

(Continued)

OTHER PUBLICATIONS

Welch et al., "Scalable Performance of the Panasas Parallel File System", Panasas® White Paper, May 2010, pp. 1-22.

(Continued)

*Primary Examiner* — Albert Decady
*Assistant Examiner* — Enam Ahmed
(74) *Attorney, Agent, or Firm* — David B. Woycechowsky

(57) ABSTRACT

A RAID (redundant array of independent storage devices) storage system where a file is stored at a physical protection level corresponding to a RAID protection level defined by metadata included in and/or with the file to be stored.

9 Claims, 4 Drawing Sheets

(56) References Cited

U.S. PATENT DOCUMENTS

| | | | | |
|---|---|---|---|---|
| 8,341,501 | B2* | 12/2012 | Franceschini | G06F 12/0246 711/103 |
| 8,359,524 | B2* | 1/2013 | Pruthi | G06F 11/1076 714/769 |
| 8,443,153 | B1* | 5/2013 | Edwards | G06F 17/30091 711/147 |
| 8,700,571 | B2 | 4/2014 | Rogers et al. | |
| 8,732,518 | B2 | 5/2014 | Storer et al. | |
| 8,880,801 | B1* | 11/2014 | Robins | G06F 12/0246 711/114 |
| 2004/0153479 | A1* | 8/2004 | Mikesell | G06F 16/182 |
| 2005/0066127 | A1* | 3/2005 | Korgaonkar | G06F 3/0601 711/114 |
| 2005/0132212 | A1* | 6/2005 | Haswell | G06F 3/0619 713/193 |
| 2006/0112219 | A1* | 5/2006 | Chawla | G06F 3/0607 711/114 |
| 2007/0214183 | A1* | 9/2007 | Howe | G06F 16/10 |
| 2007/0260830 | A1* | 11/2007 | Faibish | G06F 3/061 711/162 |
| 2010/0281213 | A1* | 11/2010 | Smith | G06F 3/0608 711/114 |
| 2012/0084506 | A1* | 4/2012 | Colgrove | G06F 11/1076 711/114 |
| 2012/0266011 | A1* | 10/2012 | Storer | G06F 11/1092 714/1 |
| 2014/0181055 | A1 | 6/2014 | Rodriguez et al. | |
| 2014/0337662 | A1 | 11/2014 | Gokhale et al. | |
| 2014/0330242 | A1 | 12/2014 | Kish | |

OTHER PUBLICATIONS

"EMC ISILON ONEFS: A Technical Overview", White Paper, Nov. 2014, pp. 1-38, EMC2®.

* cited by examiner

FILE LEVEL DEFINED DE-CLUSTERED REDUNDANT ARRAY OF INDEPENDENT STORAGE DEVICES SOLUTION

BACKGROUND

The present invention relates generally to the field of RAID (redundant array of independent storage devices) storage, and more particularly to RAID protection levels.

The Wikipedia entry for "RAID" (http://en.wikipedia.org/wiki/RAID as of 18 May 2015) states as follows: "RAID (originally redundant array of inexpensive disks; now commonly redundant array of independent disks) is a data storage virtualization technology that combines multiple disk drive components into a single logical unit for the purposes of data redundancy or performance improvement . . . . Data is distributed across the drives in one of several ways, referred to as RAID levels, depending on the specific level of redundancy and performance required. The different schemes or architectures are named by the word RAID followed by a number (e.g. RAID 0, RAID 1). Each scheme provides a different balance between the key goals: reliability, availability, performance, and capacity. RAID levels greater than RAID 0 provide protection against unrecoverable (sector) read errors, as well as whole disk failure."

In conventional RAID systems: (i) the files stored on the RAID system at different "protection levels"; and (ii) the protection level at which a given file is stored in the RAID system not defined on a single file level (that is a stored-file-by-stored-file basis) but, rather, on lower pool level. Protection level relates to the availability properties defined by Raid levels 0.1.2.3.5.6.10 . . . .

SUMMARY

According to three aspects of the present invention, there is a method, system and/or computer program product for storing files in RAID (redundant array of independent disks) environment including RAID storage hardware, by performing the following operations (not necessarily in the following order): (i) receiving a first file including protection level metadata defining a RAID protection level at which the file is to be stored; (ii) mapping the RAID protection level of the first file to a corresponding physical protection level; and (iii) storing each block of the first file on the RAID storage hardware at the corresponding physical protection level.

DETAILED DESCRIPTION

Figure 1:
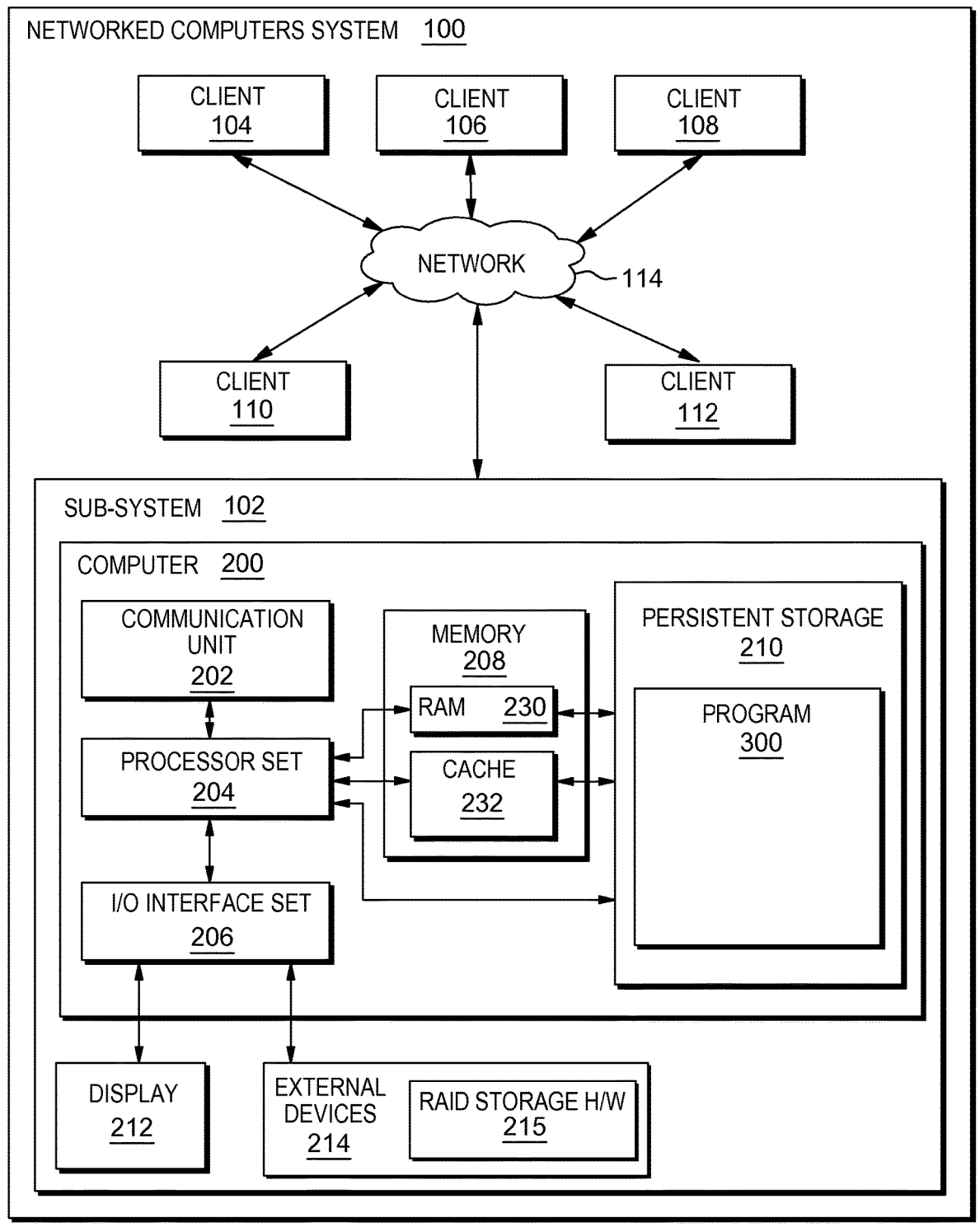
FIG. 1 is a block diagram of a first embodiment of a system according to the present invention.

Some embodiments of the present disclosure provide RAID data storage systems including a "file based RAID protection level." A file based RAID protection level means that there is meta data, corresponding to each file stored or to-be-stored in the RAID data storage system, defines a RAID protection level at which the corresponding file is and/or will be stored. An embodiment of a method for storing files in a RAID data storage system, where a file to be stored includes metadata defining RAID protection level, includes the following steps (not necessarily in the following order): (i) mapping the RAID protection level of the file to a physical protection level, wherein each block of the file is stored according to the metadata-defined RAID protection level; and (ii) storing the blocks of the file according to the metadata-defined RAID protection level.

While the quoted material, above in the Background section, is written under the assumption that the storage hardware of the RAID system is disk type storage, for purposes of this document it is to be understood that RAID storage devices can include, in whole or in part, any type of storage devices (now known or to be developed in the future). In other words "RAID" and "RAID storage hardware, as those terms are used herein are not limited to disks. A RAID array of storage devices may include a range of persistent storage devices including solid state hard drive, a semiconductor storage device, flash, Hard Disk Drives, and combinations thereof. The term "disk," as used herein, is to be understood as a generic term denoting any type of persistent storage device(s) or combinations thereof.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: RAID sub-system (also sometimes referred to, more simply, as "sub-system") 102; client sub-systems 104, 106, 108, 110, 112; communication network 114; RAID computer (also sometimes referred to, more simply, as "computer") 200; communication unit 202; processor set 204; input/output (I/O) interface set 206; memory device 208; persistent storage device 210; display device 212; external device set 214; random access memory (RAM) devices 230; cache memory device 232; and program 300. In this embodiment, client sub-systems 104, 106, 108, 110, 112 are various types of clients that use NAS (network available storage) provided by RAID sub-system 102.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

In this embodiment, RAID storage hardware 215 takes the form of peripheral devices included in external device set 214. The machine logic for controlling the storage and access in the RAID storage hardware set is provided by program 300, and will be discussed in detail in the next sub-section of this Detailed Description section. Alternatively, some, or all, of the RAID storage hardware could be provide in computer 200 (and once again, controlled by program 300).

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
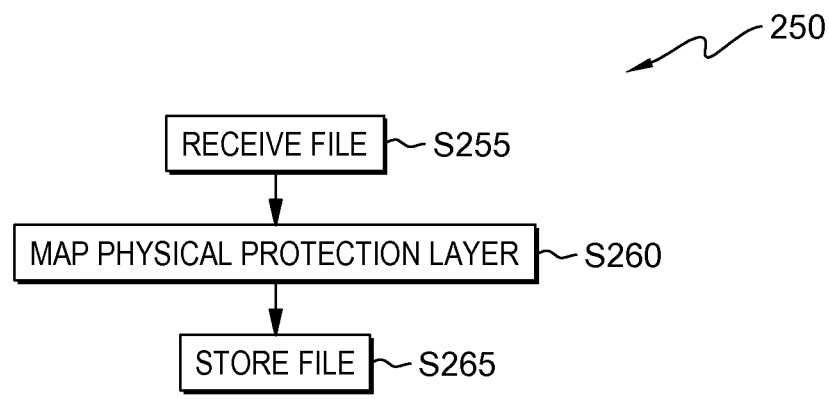
FIG. 2 is a flowchart showing a first embodiment method performed, at least in part, by the first embodiment system.
Figure 3:
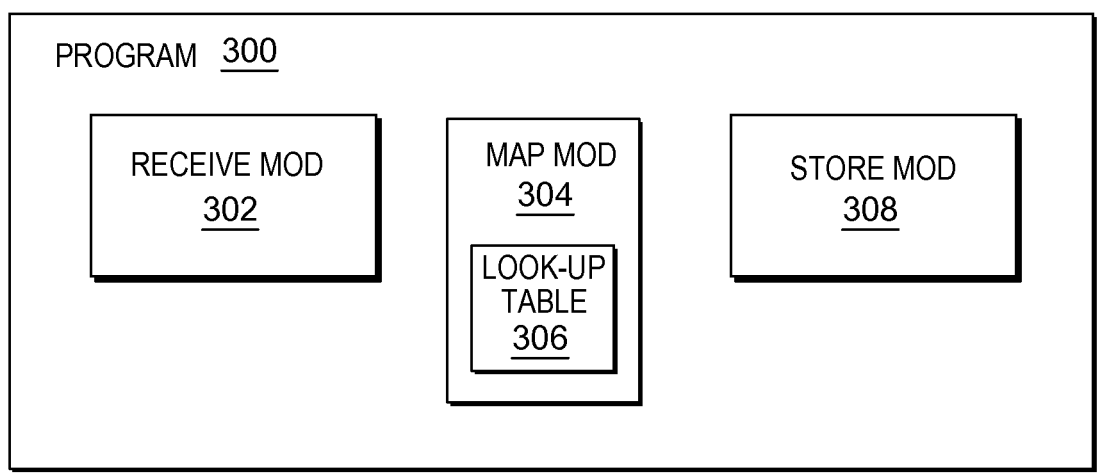
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive module ("mod") 302 receives, from client 104 and through network 114 (see FIG. 1), a file including protection level metadata defining a RAID protection level at which the file is to be stored. More specifically, the file is to be stored in the RAID storage hardware 215 of RAID sub-system 102. More specifically, the file data is decomposed into raid stripes according to the selected RAID protection level and these are to be stored in RAID store hardware 215 of external device set 214 (see FIG. 1).

Processing proceeds to step S260, where map mod 304 maps the RAID protection level of the file, as indicated by its metadata, to a corresponding physical protection level using look-up table 306. This mapping will be discussed in more detail, below, in the Further Comments And/Or Embodiments sub-section of this Detailed Description section.

Processing proceeds to step S265, where store mod 308 stores each block of the file on RAID storage hardware 215 at the physical protection level indicated by the metadata of the file. In this way, the physical protection level can be effectively controlled by the file itself. This is different than conventional method where the physical protection level is not determined by the file itself, as will be discussed in more detail, below, in the Further Comments And/Or Embodiments sub-section of this Detailed Description section.

III. Further Comments and/or Embodiments

Some embodiments of the present invention may include one, or more, of the following features, characteristics and/or advantages: (i) introduces a file based de-clustered RAID (redundant array of independent devices) virtualization; (ii) introduces a file level defined de-clustered RAID solution; (iii) introduces a new method to define the RAID protection on a file level instead of the array/storage pool level; and/or (iv) the RAID protection of each file will be determined by the software RAID stack based on the file metadata.

Some embodiments of the present invention may include one, or more, of the following features, characteristics and/or advantages: (i) user defined protection level, for example RAID 5; (ii) files that are part of a specific folder (for example, important) get high protection, for example RAID 6; (iii) files that are part of a specific folder (for example, temp) get very low protection, for example RAID 0; (iv) files that end with .jpg will get intermediate RAID 1 protection; and/or (v) files marked as confidential will get high protection, for example RAID 10.

Some embodiments of the present invention may include one, or more, of the following features, characteristics and/or advantages: (i) very high flexibility with respect to data protection; (ii) very high flexibility for a general storage capacity usage, because it is not required to define a fixed capacity per pool; (iii) possible reduction of storage space due to elimination of unnecessary copies; and/or (iv) better protection of really important data.

Some embodiments of RAID data storage systems according to the present disclosure include the following parts: (i) a file protection management module (FPMM, see definition of "module," below, in the Definitions sub-section of this Detailed Description section); (ii) a file protection policy engine; (iii) a data placement engine; and/or (iv) a software defined RAID engine extension.

Some embodiments of the present invention may include one, or more, of the following features, characteristics and/or advantages: (i) a completely new concept for a file level defined de-clustered RAID solution; (ii) each file within a file system will define its own protection level as to be stored in the underlying hardware; (iii) introduces a new FPMM; (iv) the FPMM will be integrated into existing file systems; (v) applies to an initial protection level storage; and/or (vi) applies to consecutive protection level changes. Further with regard to item (iii) above, the new FPMM manages: (i) the combination of the file protection policy engine; (ii) the software defined RAID engine; and/or (iii) the data placement engine.

Figure 4:
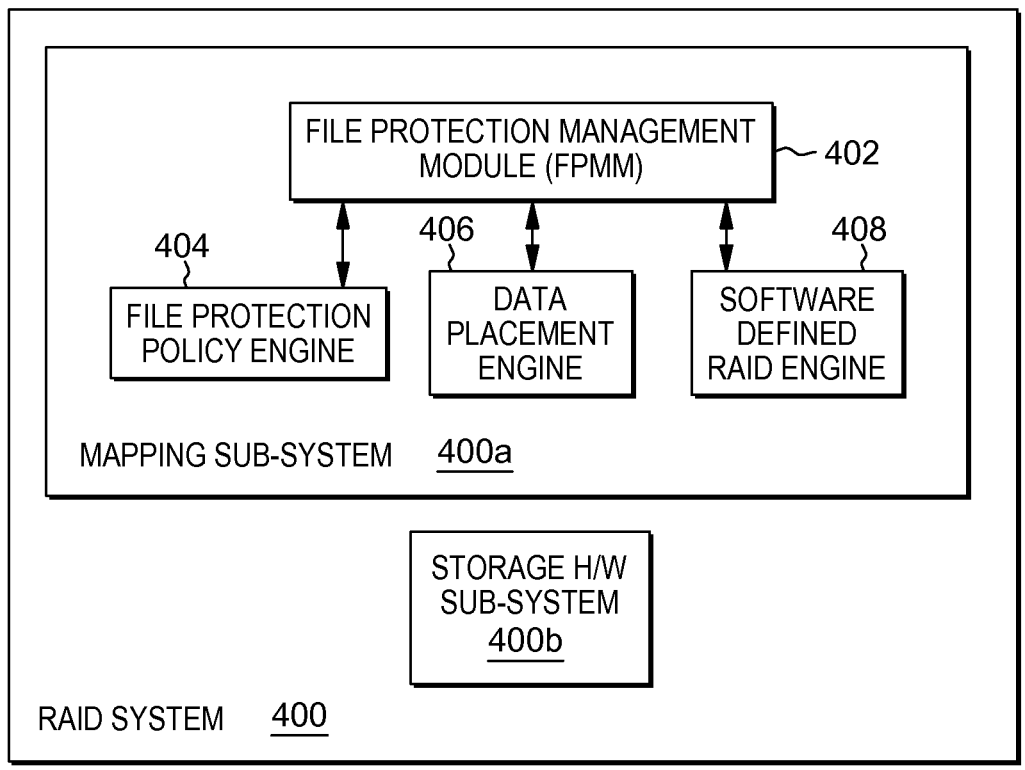
FIG. 4 is a block diagram of a second embodiment of a system according to the present invention.
Figure 6:
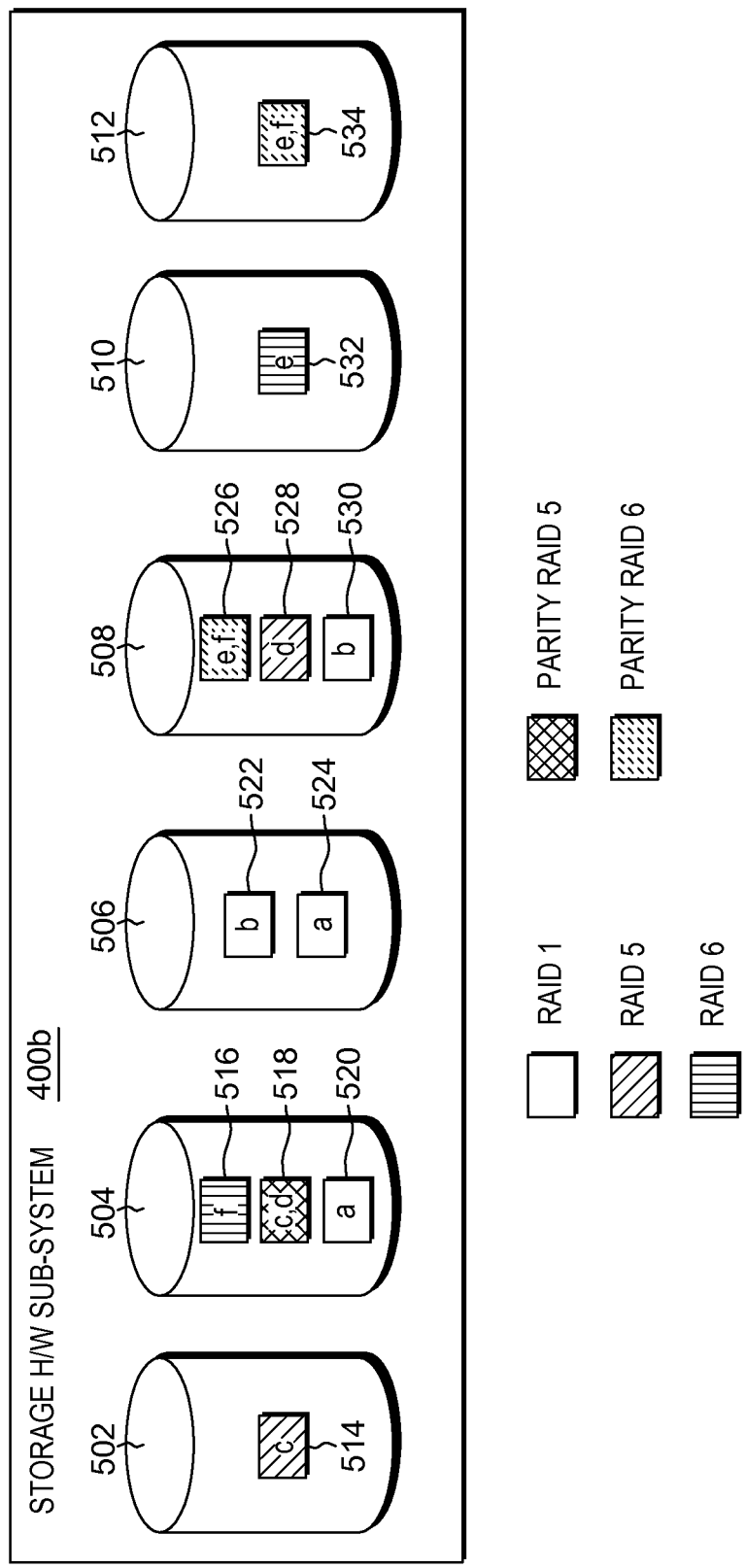
FIG. 6 is a block diagram view of another portion of the second embodiment system.

As shown in FIGS. 4 and 6, RAID system 400 includes mapping sub-system 400a and storage hardware sub-system 400b. Mapping sub-system 400a includes: FPMM (file protection management module) 402; file protection policy engine 404; data placement engine 406; and software defined RAID engine 408. Storage hardware sub-system 400b includes: hard disk drives (HDD) 502, 504, 506, 508, 510, 512; file data blocks 514 (portion of file "c"), 516 (portion of file "f"), 518 (portion of file "c" and portion of file "d"), 520 (portion of file "a"), 522 (portion of file "b"), 524 (portion of file "a"), 526 (portion of file "e" and portion of file "f"), 528 (portion of file "d"), 530 (portion of file "b"), 532 (portion of file "e"), and 534 (portion of file "e" and portion of file "f").

In this embodiment, FPMM 402 performs the following functions: (i) orchestrates the process flow to define the protection level for each file; (ii) creates the required underlying RAID levels; (iii) maps the file based protection level to the physical layer; and (iv) places the files within the created layer.

In this embodiment, file protection policy engine 404 provides the definition of the file protection level based on machine logic based policy. The following look up table illustrates this embodiment's policy for mapping between the level of file protection level and the corresponding physical layer mapping (also called, the "RAID level").

| File protection Level | RAID level |
|---|---|
| High | 1 |
| Medium | 6 |
| Low | 5 |
| unknown | 1 |

Pre-defined file protection levels are mapped to corresponding pre-defined RAID levels by FPMM 402, using the look-up table of file protection policy engine 404.

In this embodiment, data placement engine 406 performs the following functions: (i) manages the blocks associated to each file; (ii) places and later on migrates (depending on increase/decrease of the protection level) the data (depending on the FPMM 402 information) into the correct RAID level provided by the software defined RAID engine 408; (iii) receives the file based protection level mapped to the physical protection level; and/or (iv) stores the related blocks related to the layer.

In this embodiment, machine logic of mapping sub-system 400a makes the following decisions: (i) files part of a specific folder (for example, important) get high protection, for example "high"; (ii) files part of a specific folder (for example, temp) get very low protection, for example "low"; (iii) files that end with .jpg will get intermediate protection level "medium"; and/or (iv) files marked as confidential will get high protection, for example "high". All files not handled by one or more policies or by manual interaction will be set as "unknown" to allow FPMM 402 to map this kind of files to a pre-defined default protection level.

For clustered file system integration, the data placement engine 406 may be constructed by modifying the existing clustered file system policy engine to include a file protection policy engine according to various embodiments of the present invention. File protection policy engine 404 places files on fixed sized named pools. In this embodiment, the following clustered file system policy engine statements (sometimes herein referred to as "pseudo code") make use of pools "pool1" and "system":

```
"/* The fileset does not matter, the system designer
wants all .dat and .DAT files to go to pool1 */
RULE 'datfiles' SET POOL 'pool1' WHERE UPPER(name) like
'%.DAT'
/* All non *.dat files placed in filset5 will go to
pool1 */
RULE 'fs5' SET POOL 'pool1' FOR FILESET ('fileset5')
/* Set a default rule that sends all files not meeting
the other criteria to the system pool */
RULE 'default' set POOL 'system'"
"
```

In this embodiment, FPMM 402 implementation of placement engine 406 does not use fixed pools but, rather, uses the file protection level (FPL). Example syntax (pseudo code) follows:

```
"/* The fileset does not matter, the system designer
wants all .dat and .DAT files to have High protection
level */
RULE 'datfiles' SET FPL 'High' WHERE UPPER(name) like
'%.DAT'
/* All non *.dat files placed in filset5 will go to
Medium */
RULE 'fs5' SET FPL 'Medium' FOR FILESET ('fileset5')
/* Set a default rule that sends all files not meeting
the other criteria to the unknown */
RULE 'default' set FPL 'unknown'"
"
```

Software defined RAID engine 408 operates as follows: (i) FPMM 402 will provide the required RAID level to software defined RAID engine 408; (ii) engine 408 creates and maintains the physical layer and allows placement engine 406 to store the files on the mapped physical layers; (iii) engine 408 handles errors within the physical layer; and (iv) in case of HDD (hard disk drive) failures (1 . . . n) this stack will ensure that the data is recovered based on the defined RAID level and that the redundancy is reached again based on the on file level defined protection.

In this embodiment, mapping sub-system 400a operates as follows: (i) software defined RAID engine 408 receives data from the FPMM 402 with the assigned protection level; (ii) the RAID level derived from the protection level will determine how stripes of block storage are allocated (that is, 2 stripes to form a mirrored block, 5 stripes for a 4+P RAID 5, 11 stripes for a 8+3P RAID 6); (iii) the distribution of user data to these stripes is done as indicated by the RAID (existing technology); (iv) the allocation of block storage, however, is on demand per incoming file (rather than fixed pools); and (v) existing technology free block and block chain management is applied to keep track of used and unused blocks.

Figure 5:
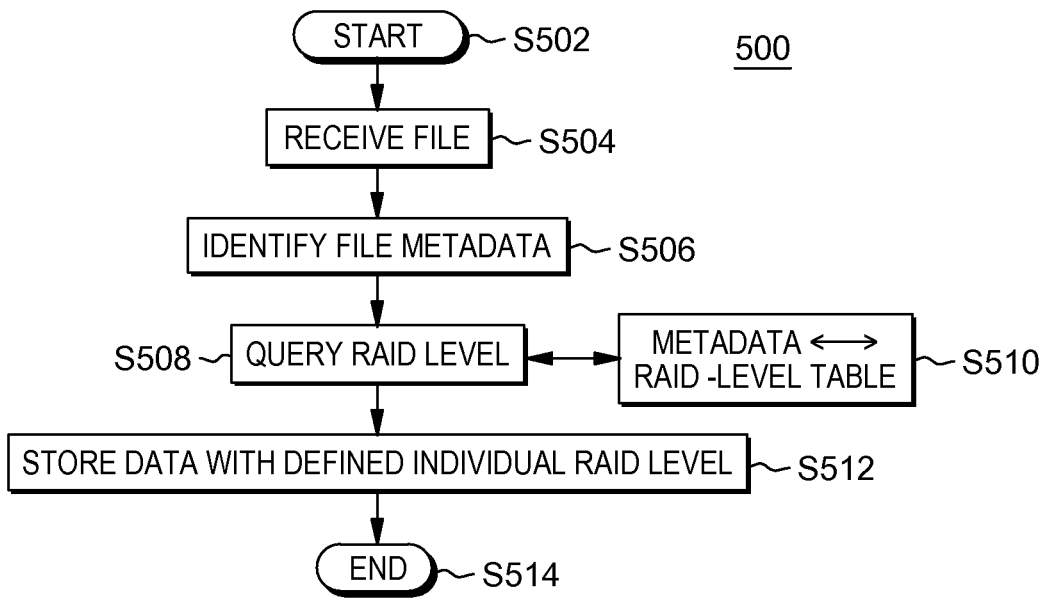
FIG. 5 is a flowchart of a second embodiment of a method according to the present invention.

File level defined protection process flow used in RAID system 400 will now be discussed with reference to FIG. 5. FIG. 5 shows a flowchart 500 which outlines the principle flow of the file level defined RAID solution according to some embodiments of the present invention.

Processing begins at operation S502.

Processing proceeds to operation S504 where the file metadata is received.

Processing proceeds to operation S506 where the file metadata is identified.

Processing proceeds to operation S508 where the machine logic defines the RAID level of the specific file, which is based on the user-defined metadata (RAID level table), operation S510.

Processing proceeds to operation S512 where the data is stored with the defined individual RAID level.

Processing concludes at operation S514.

As shown in FIG. 6, storage hardware sub-system 400b handles data storage according to the file level defined protection scheme described above in connection with mapping sub-system 400a. Storage hardware sub-system 400b handles the placement, for example, of a single file containing two file data blocks. Identical file data blocks are marked by the same letter, and the RAID level is marked by different patterns as shown in the legend of FIG. 6. For a file that contains more blocks, the process will be replicated. For RAID 1, the file data block will be copied to another HDD. For RAID 5, the parity information is stored on a separate HDD. For RAID 6, two independent parity blocks are calculated and stored. As shown FIG. 6, the system places a single user data block into stripes for RAID 1, RAID 5, and RAID 6. As an example, file data block 520 within HDD 504, along with file data block 524 within HDD 506, make up the entire contents of file "a".

Some embodiments of the present invention may include one, or more, of the following features, characteristics and/or advantages: (i) offers a completely new concept for a file level de-clustered RAID solution; (ii) removes the traditional pool/fixed split of storage by protection level and applies it to the file level, which is the object that users handle within a file system; (iii) improves flexibility for the users with respect to data protection, and also for a general storage capacity usage, because it is not required to define a fixed capacity per pool any longer; (iv) option to reduce storage space by eliminating unnecessary security copies; and/or (v) real important data will be better protected. As such, some embodiments of the invention may be a direct fit for existing file products.

Some embodiments of the present invention include the following modules: (i) file level defined RAID policy which defines the required RAID protection based on the file metadata); (ii) file level defined placement engine extension which manages the blocks associated to each file stored on the JBOD based on the defined metadata RAID protection level; and/or (iii) file level defined RAID rebuild engine where, in case of HDD failures (1 . . . n), the software RAID stack will ensure that the data is recovered based on the defined RAID level and that the redundancy is again reached based on the on file level defined protection.

Some embodiments of the present invention may include one, or more, of the following features, characteristics and/or advantages: (i) protects data in the granularity of a single file; (ii) protects file(s) based data on file level defined protection; (iii) does not create and/or maintain digital archives; and/or (iv) provides file based protection level definition on files. Further with regard to item (i) above, the file protection level is: (i) defined within the metadata of each file; and/or (ii) not related to the underlying storage system.

Some embodiments of the present invention may include one, or more, of the following features, characteristics and/or advantages: (i) relates to a method for storing files in a RAID environment; (ii) protection level is defined on a lower pool level; (iii) introduces a file based RAID protection level by including, in the metadata of each file, the RAID protection level; and/or (iv) ability to store files in a RAID environment. Further, each file to be stored includes a metadata defining RAID protection level including: (i) mapping RAID protection level of each file to a physical protection level, where each block of files is stored according to a defined RAID protection level; and/or (ii) storing blocks of files according to a defined RAID protection level.

Some embodiments of the present invention may include one, or more, of the following features, characteristics and/or advantages: (i) provides software defined RAID; (ii) provides software based RAID; (iii) provides software initiated RAID; (iv) establishes the RAID protection level of files to be stored; and/or (v) the RAID protection level is part of the metadata of the file to be stored.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   providing a RAID (redundant array of independent devices) storage system configured to store data at a plurality of different RAID protection levels, with each RAID protection level corresponding to a different manner of distributing data across a plurality of physical RAID storage devices in the redundant array;
   receiving a plurality of files, with each file of the plurality of files including as constituent parts of the file: (i) a plurality of data blocks, and (ii) protection level metadata indicating a RAID protection level at which the file is to be stored; and
   for each given file of the plurality of files:
      determining the RAID protection level for the given file based on the protection level metadata of the given file, and
      responsive to the determination of the RAID protection level for the given file, storing all data blocks of the plurality of data blocks of the given file so that the data is distributed across the physical RAID storage device of the redundant array in a manner according to the RAID protection level for the given file.

2. The method of claim 1 wherein the determination of the RAID protection level for the given file based on the protection level metadata of the given file, is not based upon policies programmed into the RAID storage system.

3. The method of claim 1 wherein the protection level metadata value of each file corresponds to its level of confidentiality.

4. A computer program product (CPP) for use with a RAID (redundant array of independent devices) storage system configured to store data at a plurality of different RAID protection levels, with each RAID protection level corresponding to a different manner of distributing data across a plurality of physical RAID storage devices in the redundant array, the computer program product comprising:
   a non-transitory machine readable storage device; and
   computer code stored on the machine readable storage device, with the computer code including instructions for causing a processor(s) set to perform operations including the following:
   receiving a plurality of files, with each file of the plurality of files including as constituent parts of the file: (i) a plurality of data blocks, and (ii) protection level metadata indicating a RAID protection level at which the file is to be stored; and
   for each given file of the plurality of files:
      determining the RAID protection level for the given file based on the protection level metadata of the given file, and
      responsive to the determination of the RAID protection level for the given file, storing all data blocks of the plurality of data blocks of the given file so that the data is distributed across the physical RAID storage device of the redundant array in a manner according to the RAID protection level for the given file.

5. The CPP of claim 4 wherein the determination of the RAID protection level for the given file based on the protection level metadata of the given file, is not based upon policies programmed into the RAID storage system.

6. The CPP of claim 4 wherein the protection level metadata value of each file corresponds to its level of confidentiality.

7. A RAID (redundant array of independent devices) storage system configured to store data at a plurality of different RAID protection levels, with each RAID protection level corresponding to a different manner of distributing data across a plurality of physical RAID storage devices in the redundant array, with the RAID storage system a computer program product comprising:
   a non-transitory machine readable storage device; and
   computer code stored on the machine readable storage device, with the computer code including instructions for causing a processor(s) set to perform operations including the following:
   receiving a plurality of files, with each file of the plurality of files including as constituent parts of the file: (i) a plurality of data blocks, and (ii) protection level metadata indicating a RAID protection level at which the file is to be stored; and
   for each given file of the plurality of files:
      determining the RAID protection level for the given file based on the protection level metadata of the given file, and
      responsive to the determination of the RAID protection level for the given file, storing all data blocks of the plurality of data blocks of the given file so that the data is distributed across the physical RAID storage device of the redundant array in a manner according to the RAID protection level for the given file.

8. The system of claim 7 wherein the determination of the RAID protection level for the given file based on the protection level metadata of the given file, is not based upon policies programmed into the RAID storage system.

9. The system of claim 7 wherein the protection level metadata value of each file corresponds to its level of confidentiality.

* * * * *